United States Patent [19]

George et al.

[11] Patent Number: 4,798,020

[45] Date of Patent: Jan. 17, 1989

[54] SYSTEM FOR HARVESTING CRAWFISH

[76] Inventors: Albert L. George, P.O. Box 3604, Lafayette, La. 70502; Don Gooch, 875 Hoyt Rd., Boyce, La. 71409

[21] Appl. No.: 5,590

[22] Filed: Jan. 21, 1987

[51] Int. Cl.⁴ .......................................... A01K 81/04
[52] U.S. Cl. ...................................... 43/6.5; 209/935
[58] Field of Search ................. 43/6.5, 4, 9, 26.1, 43/15; 209/938, 633, 674

[56] References Cited

U.S. PATENT DOCUMENTS

| | | | |
|---|---|---|---|
| 1,099,407 | 6/1914 | Swayger | 209/633 |
| 1,960,857 | 5/1934 | Stoltenberg | 209/935 |
| 2,728,458 | 12/1955 | Greiner | 209/674 |
| 2,828,012 | 3/1958 | Komuchar | 209/935 |
| 2,837,209 | 6/1958 | Forbes | 209/935 |
| 4,187,946 | 2/1980 | Stevenson | 209/935 |
| 4,663,879 | 5/1987 | Bergerson, Jr. | 43/6.5 |

*Primary Examiner*—Nicholas P. Godici
*Assistant Examiner*—Karen Skillman

*Attorney, Agent, or Firm*—Pravel, Gambrell, Hewitt, Kimball & Krieger

[57] ABSTRACT

A movable vehicle supported by a plurality by a pair of front and rear wheels or tracks, upon which a structural frame is set upon, the vehicle driven by a fuel engine which would in turn power a hydraulic pump for steering, lifting and rotating and other purposes on the vehicle. The vehicle would include primary collection system along its leading edge, which would include a means such as gas and water eductor lines for educting fluid into the pond at a point ahead of the on moving vehicle, so that the crawfish which may be hiding or settled at the bottom of the pond would tend to be disturbed and float to a level within the water in the pond, and urged into the forward moving trapping device by the relative movement of pond water to the vehicle combined with the urging of pressurized water and air floor toward the forward opening of the harvesting device.

16 Claims, 8 Drawing Sheets

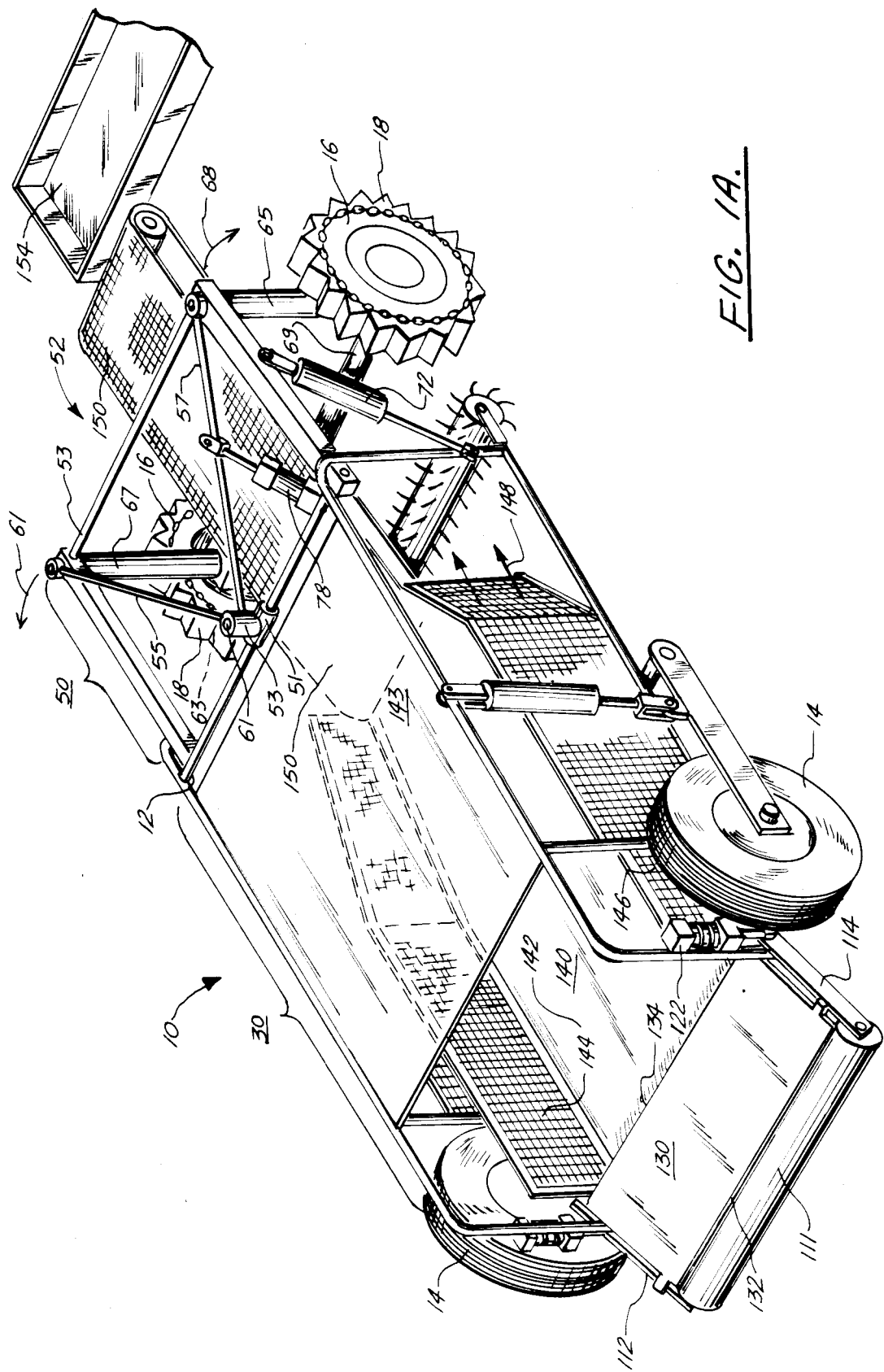

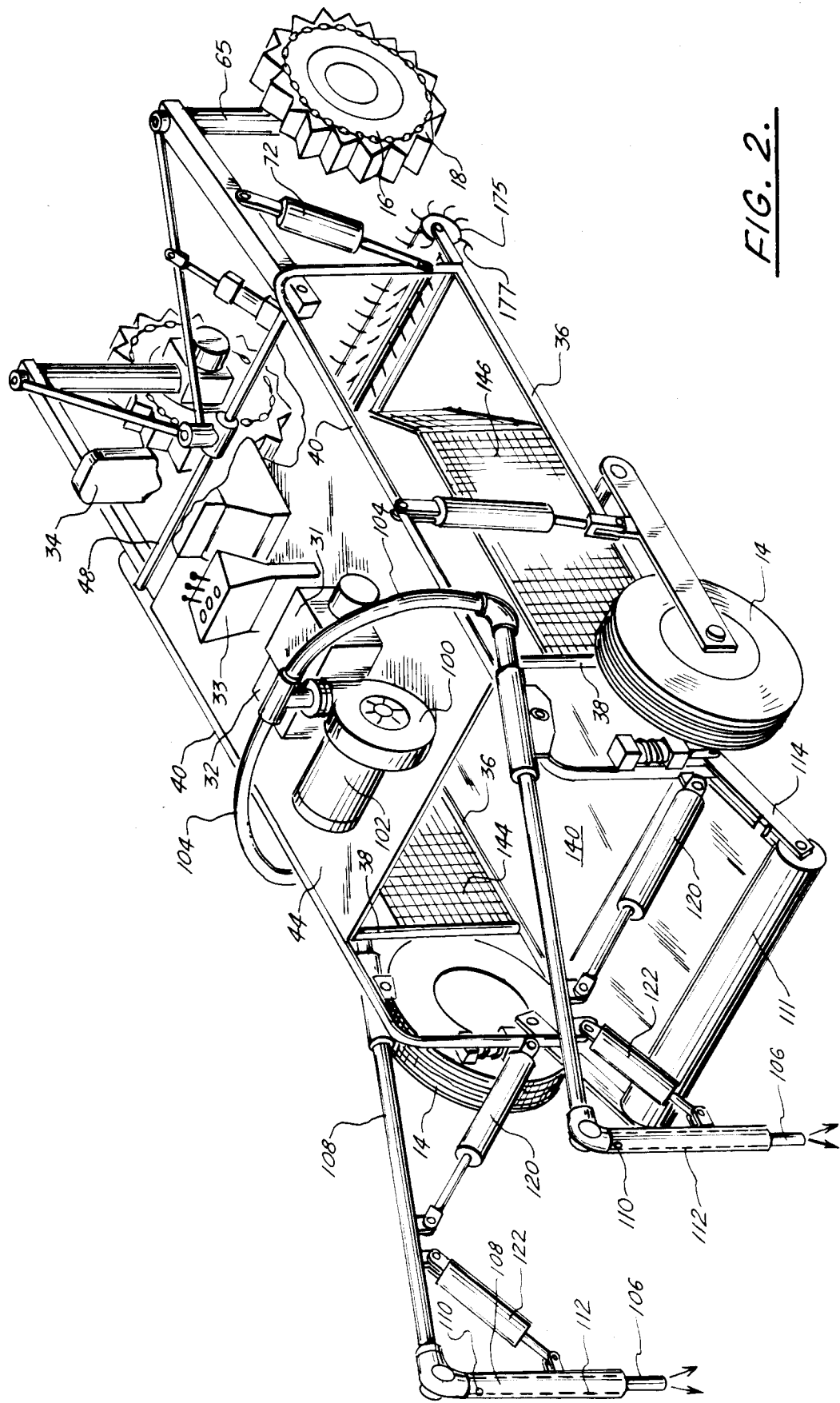

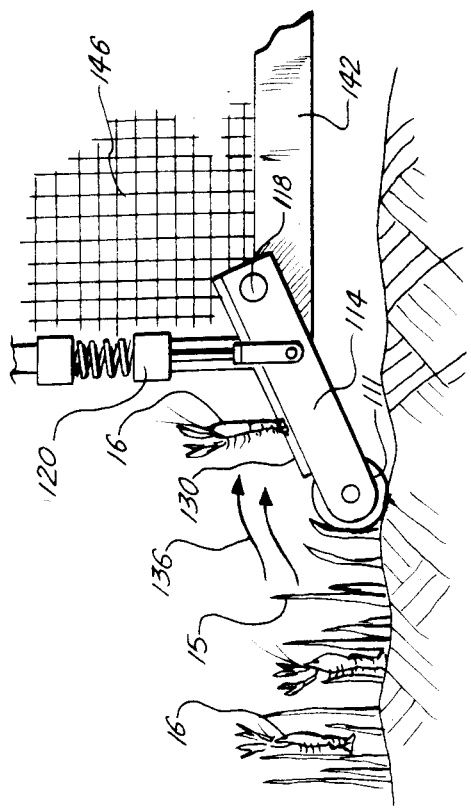
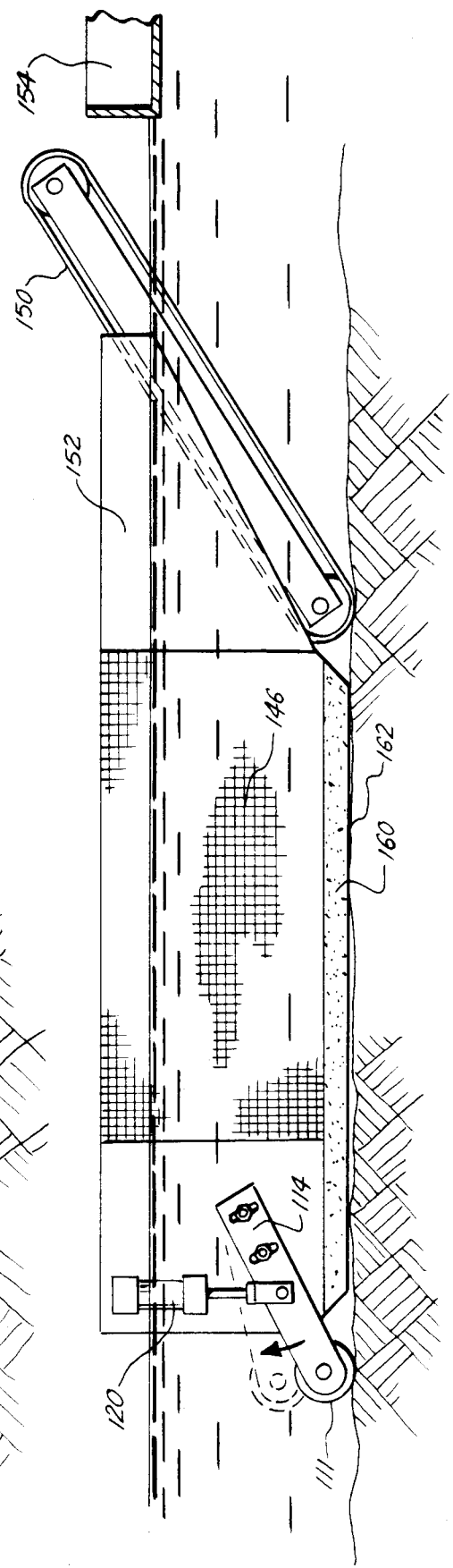

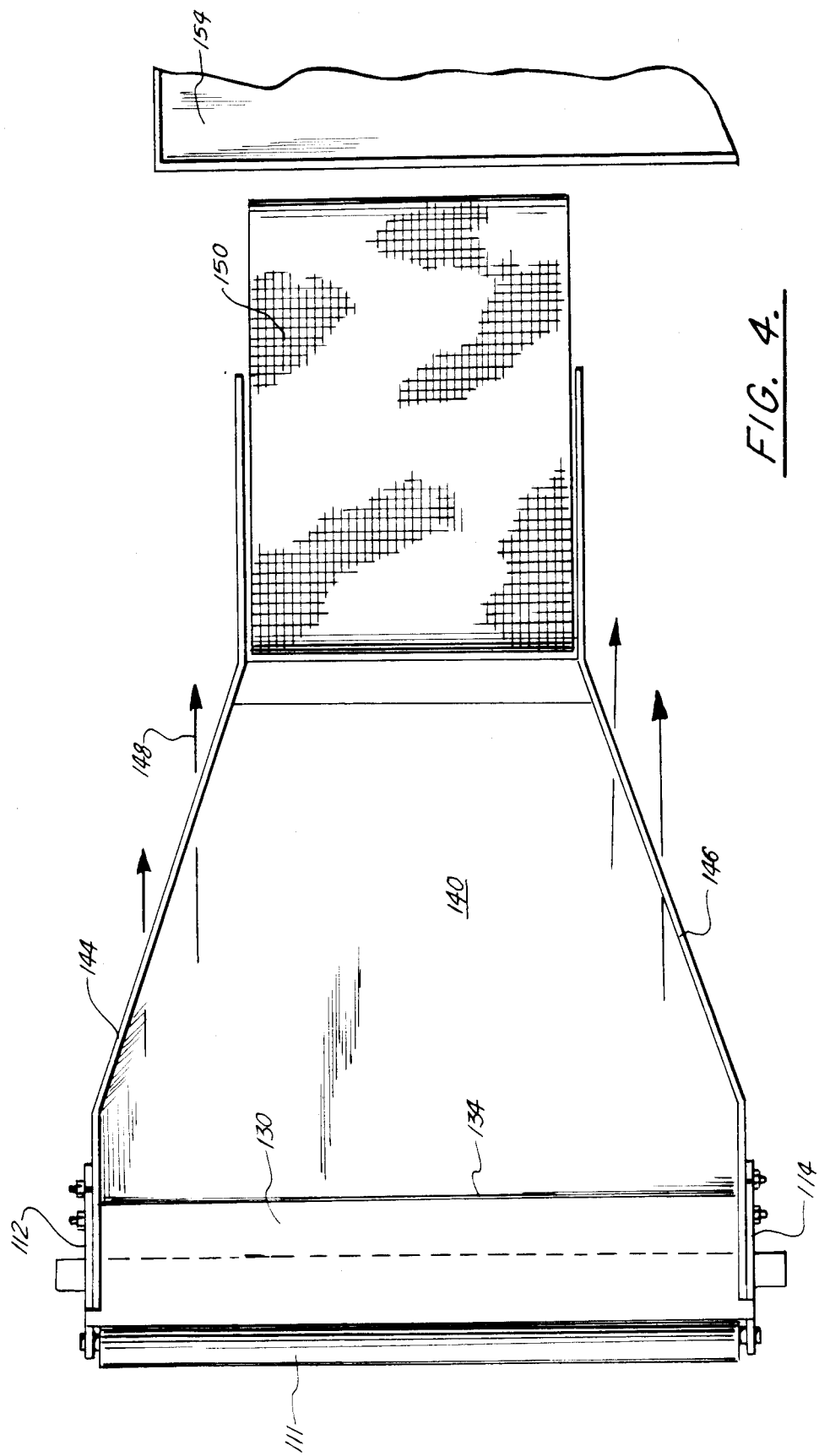

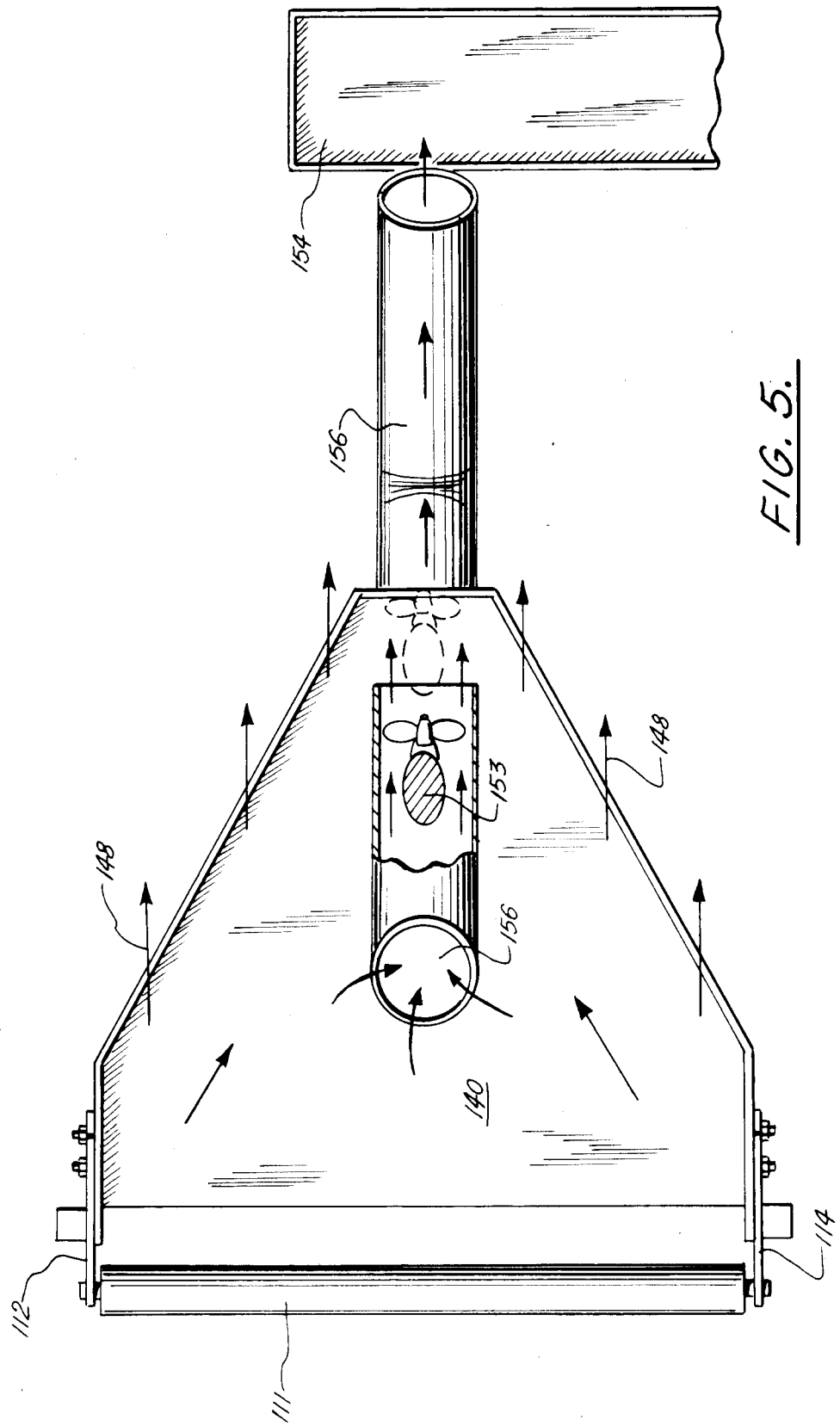

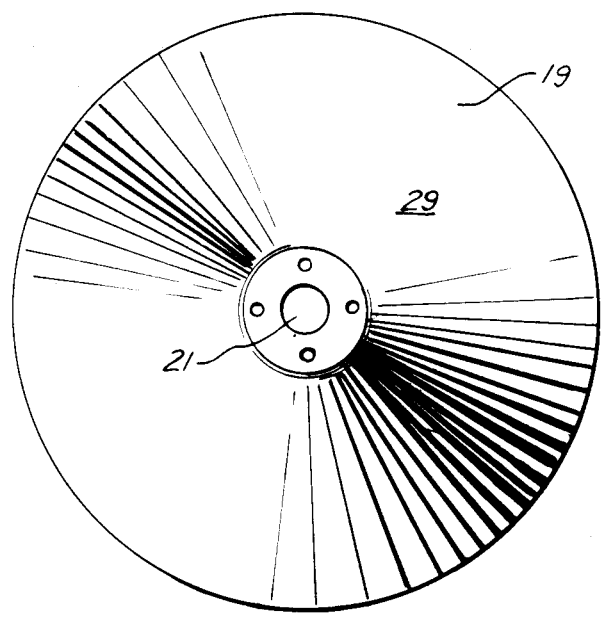
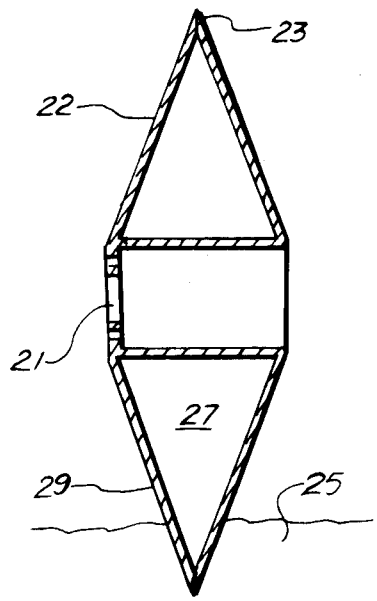
FIG. 8.
FIG. 9.
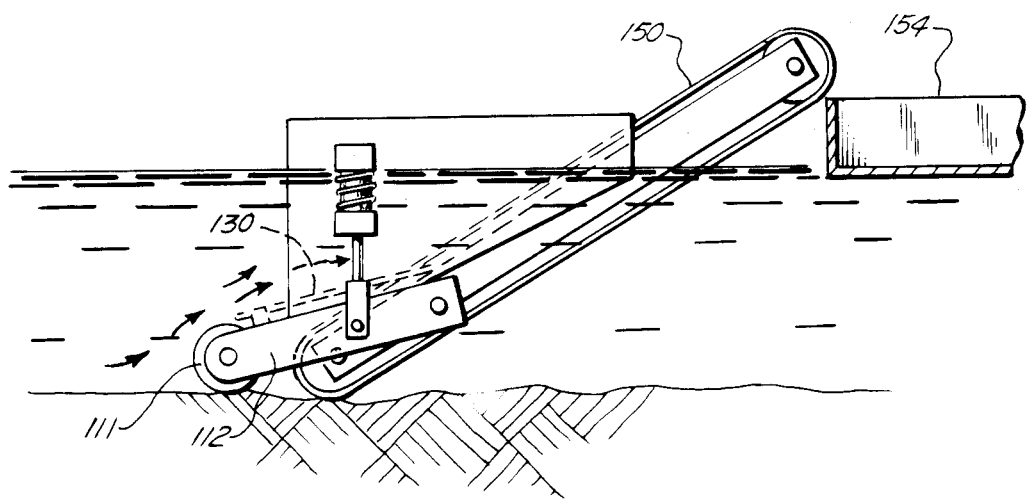
FIG. 6.

SYSTEM FOR HARVESTING CRAWFISH

BACKGROUND OF THE INVENTION

1. Field of the Invention

The present invention relates to the harvest of acquatic organisms such as crawfish, and more particularly, the present invention relates to a system for "achieving baitless" harvesting of crawfish through the use of a moveable collection device wherein the crawfish are dislodged from their forage habitat and moved by a current of pond water focused toward a collection area as the collection device is moved in a forwardly direction through and with little effect to the pond vegetation; from the first collection zone the crawfish are transported by fluid flow, air assistance, or conveyor to a point above the water level for final capture and further processing.

2. General Background

Within the expanding acquaculture industry, there are several species of edible freshwater crustacea, commonly known as crawfish. The main crawfish harvested in Louisiana are members of the genus designated as Procambarus. As an established, renewable industry in Louisiana and rapidly expanding to other states as well as foreign countries, crawfish farming provides a source of food which in the southern United States is usually referred to as "crawfish", "crayfish", or "crawdads". Due to the popularity of crawfish in France and as a result of the Acadian or Cajun influence in Louisiana, the French term "ecrevisse" also denotes this animal.

Crawfish are consumed in large quantities during a typical crawfish season. Along the Gulf Coast, many seafood restaurants feature crawfish as a specialty preparing them in a variety of ways. In areas where crawfish are raised in abundance, large processing plants handle thousands of pounds of crawfish daily. Louisiana alone produces up to 70 million dollars worth of crawfish annually and has expanded acreage for crawfish culture every year since 1960 to 1985 where there is approximately 125,000 acres in production, with anticipated growth in the coming years expected to reach an excess of 400,000 acres.

The expansion of crawfish markets in production has brought into sharp focus some significant problems facing this industry. One of the major problems which each crawfish farmer must address is finding an economic and reliable means of harvesting a crop of crawfish. In many cases, the cost of harvesting crawfish approaches or exceeds 50% of their market price. The use of bait as an attractant in conjunction with some sort of net or trap has been and remains the primary method of harvesting crawfish.

The simple method of catching crawfish with a piece of bait tied to a string is often used by children in roadside ditches. Recreational crawfishing by adults most frequently employs baited liftnets. The vast majority of the commercial crawfish catch is harvested using baited wire mesh traps having funnels. Such traps allow crawfish to easily enter attracted by the bait, but makes it difficult for them to find their way out of the trap. However, initial investment for traps will reach or exceed $100.00 to $200.00 an acre. Recurring cost for traps would also include repair, replacement, handling and storage on an annual basis.

In order for crawfish ponds to be considered productive, intensive and continuous harvesting must take place so as to remove crawfish as soon they become market size and thereby making the limited space and food supply available for use by smaller and immature crawfish. Current recommendations call for daily harvest using 30 to 40 traps per acre in commercial crawfish ponds. Fishing crawfish ponds in this manner produces a maximum yield yet cost for buying storage and handling bait becomes critical. It is not uncommon for a 100 acre crawfish farm to incur expenses relating to bait to be in excess of $20,000 during a single season.

Not only is crawfish bait expensive, it makes for additional labor considerations and involves the task of handling bait which is messy and which often has a strong unpleasant odor. The use of bait for the purpose of harvesting crawfish, although a primitive and expensive procedure, has yet to be replaced by alternative methods.

Recognizing a bottle neck in the culture of the crawfish, much research by universities and many individuals has been conducted towards finding an improved method designed to harvest crawfish. Some of the alternative approaches to the traditional "baited" trap includes electric harvesters which shock crawfish to the surface and allows a scooping device to catch them as a harvester moves through a pond; the use of water current over spillways which takes advantage of behavioral tendencies for crawfish to exit ponds according to directional flow; traditional and modified seines and trauls; the use of vibrations to attract or repel crawfish; and finally chemical attractants.

Additional research has been attempted to improve traditional baited trap use and design. Research for improving the efficiency of baited traps has included the development of an irrigation type harvester which moves slowly back and forth across the pond setting and emptying traps as it goes. Research and development of artificial bait has become influential and widely used among crawfish farmers over a natural bait and cut fish continues to be used in large quantities. However, the disadvantage of using bait to entice crawfish into a trap or the like extends far beyond the cost of the bait itself. Bait subject to spoilage must be refrigerated and must be replaced in traps as it loses it freshness. Old bait mixed in with live crawfish increases mortality and spoilage, appears unappetizing and must be removed before cooking or processing.

Therefore, it would be a vast improvement in the harvesting of crawfish to introduce into the industry a system for harvesting crawfish which is baitless, and can be used over a very large acreage such as the ponds where the crawfish are cultivated, whereby the crawfish may be removed quite easily from the bottom of the pond, and collected in a collection zone on the vehicle for further processing.

Several patents have issued which address both the harvesting of crawfish and the general area of harvesters themselves as applied to certain food stuffs. These patents are as follows:

| Patent No: | Inventor: | Title: |
| --- | --- | --- |
| 4,563,830 | Cain, Jr., et al | "Process And Apparatus For Harvesting Soft Shell Crayfish" |
| 4,551,938 | Sheldon, et al | "Retrieval Of Lobsters And Other Objects" |
| 814,762 | Yeager | "Picke Grading Machine" |
| 1,099,407 | Swayger | "Harvester" |
| 2,062,946 | Sorensen | "Washing And Grading Machine" |

-continued

| Patent No: | Inventor: | Title: |
|---|---|---|
| 2,292,068 | Grayson | "Apparatus For Size Grading Shrimp" |
| 3,750,233 | Lovett | "Shrimp Separating Methods" |
| 2,728,455 | Greiner | "Grading Machine For Shrimps" |
| 2,888,709 | Lapeyre | "Machine For Separating Shrimp From Fish And De-Heading The Shrimp" |
| 4,016,625 | Mitchell | "Apparatus For Sizing And Deheading Shrimp" |
| 3,799,336 | Holman | "Method And Apparatus For Treating Discrete Articles" |
| 3,784,007 | Skrmetta | "Dynamic Shrimp Grader And Grading Method" |
| 4,187,946 | Stevenson | "Worm Harvester" |
| 1,960,857 | Stoltenberg | "Potato Harvesting Apparatus" |

SUMMARY OF THE PRESENT INVENTION:

The system of the present invention solves the problems in the harvesting of crawfish in a simple and straight-forward manner. What is provided is a movable vehicle supported by wheels, tracks, pontoons or a combination thereof, upon which a structural frame is set, the vehicle is driven by a fuel engine which would in turn power a hydraulic pump for steering, lifting, propelling and other purposes on the vehicle. The vehicle would include a primary collection system along its leading edge, which would include a first roller spaning the width of the vehicle, gently moving the mature crawfish onto a receiving surface, then onto a primary containment zone which is disposed between substantially vertical, perforated side walls, then where the crawfish are moved rearwardly and deposited onto a coveyor means for conveying the crawfish upwardly to a portion of the vehicle and to a primary collection zone for further process. The receiving surface would further serve the function of disallowing any crawfish that would have a tendency to retreat away from the conveyor to be blocked in their path of escape by the receiving surface, so that they may be contained and conveyed upwardly. In addition, so that the crawfish are not harmed and to maintained a constant contact with the pond bottom the primary collection system would then include the primary roller which is spring loaded so that upon encountering any obstruction on the pond bottom or the like, the roller would be slightly bouyed and allowed to roll past any obstructions. It is critical that the leading edge of the roller in the primary collection system would accomplish (a) minimize damage to foliage or habitat as the mechanism moves through the water; and (b) dislodge the crawfish from their natural habitat of grass within the water; and (c) simultaneously create a current surge to surge the crawfish over the roller and onto the receiving surface.

In addition, rear drive wheels would be mounted to the frame, preferably via a central pivot, so that the moving of the pivot from where the wheels are mounted would enable the vehicle to turn in a tight circle or the like as the vehicle moves through the pond and allows the rear wheels to track the front wheels leaving a minimum amount of disturbed bottom material.

An additional feature in the primary collection system would include a means such as gas or water eductor lines situated at a point in advance of the vehicle for educting fluid into the pond at a point ahead of the on moving vehicle, so that the crawfish which may be hiding or settled at the bottom of the pond would tend to be disturbed and move to a level within the water in the pond to facilitate movement of the crawfish over the primary roller and onto the receiving surface. Thus, the crawfish would be urged into the containment zone, both by the flowing pond water, and the urging of the two phase flow from the eductors toward the containment zone.

Additional embodiments may include an additional primary means for moving the crawfish into the collection box, this means might include depositing the crawfish from the primary conveyor into an enlarged channel whereby water is propelled via a blade or the like and conveyed to the upper collection zone therefore moving the crawfish along with it. Of course, the collection box would contain a plurality of holes in its bottom so that the water may drain through and the crawfish maintained in the box. Also, for the purpose of arousing an urging crawfish onto the receiving surface. An additional embodiment may include a plurality of motors such as outboard motors in place of the eductor lines, so that the rotating blades beneath the water would tend to push the water and crawfish onto the receiving surface for moving to the containment zone, then onto the primary conveyor and into the primary collection box.

Therefore, it is a principal object of the present invention to provide a system for harvesting crawfish from its natural habitat, which includes a movable vehicle that can cover vast amounts of acreage in the harvesting process;

It is still a further principal object of the present invention to provide a vehicle for harvesting crawfish which allows crawfish to be conveyed onto a primary conveyor and be deposited into a collection chamber in the rear of the vehicle;

It is still a further principal object of the present invention to provide a crawfish collection vehicle which moves unobstructed through the water of the crawfish pond, yet includes a system for arousing the crawfish to enter the system at the front of the vehicle and to be collected into a primary collection zone in the rear of the vehicle;

It is still a principal object of the present invention to provide a vehicle which is self propelled, through a crawfish pond, including means for arousing, capturing, conveying, collecting and grading crawfish within the vehicle itself as the vehicle moves through crawfish ponds;

It is still a principal object of the present invention to move through ponds without disturbing the habitat, while reducing basic oxygen demand.

DETAILED DESCRIPTION OF THE DRAWINGS

FIG. 1A is an overall perspective view of the preferred embodiment of the apparatus of the system of the present invention;

FIG. 1B is an isolated view of the roller assembly in the preferred embodiment of the apparatus;

FIG. 2 is an overall perspective view of the preferred embodiment of the apparatus of the system of the present invention, illustrating the eductor lines incorporated therein;

FIG. 3 is a side view of the harvesting portion of the system of the present invention;

FIG. 4 is a top view of the harvesting portion of the system of the present invention;

FIG. 5 is a top view of a first alternate embodiment of the system of the present invention;

FIG. 6 is a side view of an alternate embodiment of the harvesting system of the present invention;

FIGS. 8 and 9 are side and cross-sectional views respectively of the preferred embodiment of the wheels driving the vehicle of the system of the present invention.

DETAILED DESCRIPTION OF THE PREFERRED EMBODIMENT

Figure 7A:
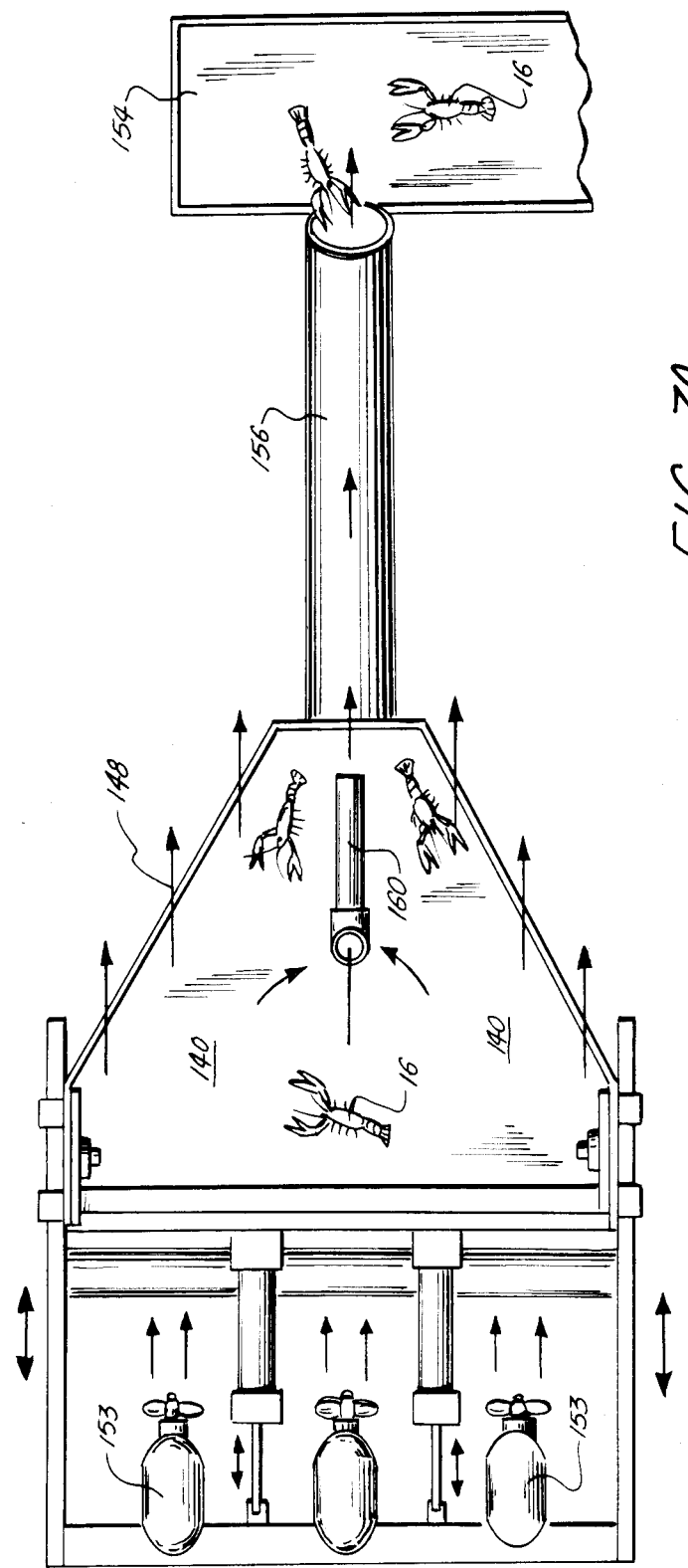
FIGS. 7A & 7B are top and side views respectively of a second alternate embodiment of the system of the present invention.

As seen in the FIGURES, crawfish harvester 10 would include a primary harvesting vehicle 12 having a pair of forward wheels 14 and a pair of rear drive wheels 16, the front and rear left and right wheels aligned substantially along a single line for easier movement within the pond and to reduce the number of ruts in the pond bottom to a minimum. For purpose of discussion, apparatus 10 would be the type of harvester that would be used in a crawfish pond, of the type wherein there may be one to three feet of water setting over a soft bottom, and the harvester would move through the water during the harvesting process.

Therefore, for purposes of illustration the rear wheels 16 are provided with a plurality of spiked members 18 which would serve to achieve better traction within the muddy bottom, and move the vehicle within the mud. However, for purposes of an alternative embodiment, reference should be made to FIGS. 8 and 9 wherein there is provided side and cross-sectional views respectively of an additional embodiment 19 of both the drive wheel and the front wheel, the embodiment including a hub portion 21 surrounded by a continuous wheel portion 22, the wheel portion forming a apex 23 at its outer most edge so that the wheel would cut into the layer of mud 25 as indicated in FIG. 9. For purposes of buoyancy, wheel 19 would have a hollow core 27 surrounded by the external skin 29 of the wheel. Again, for purposes of illustration wheel 19 as seen in the FIGURES, could be used as the four wheels of the vehicle to replace the wheels as seen in FIG. 1.

Turning now to the principal embodiment 10 of the vehicle itself, it should be noted that the vehicle is primarily designed as the first or forward portion 30 being designed for arousing, collecting, conveying and storing the crawfish obtained during the harvesting process, and the rear portion 50 being designed primarily as the guiding or steering section of the vehicle, the front portion 30 and rear portion 50 comprising each substantially the forward and rear half of the vehicle respectively.

For purposes of clarification the vehicle would be driven by a fuel engine 31 which would in turn power a hydraulic system 32 which would operate to steer the vehicle and power the various hydraulic components of the system as will be discussed further. There is further included an operation console 33 on the top portion vehicle wherein a driver may be seated upon seat 34 for steering and operating the system of the harvester during the process.

Prior to a discussion of the harvesting front portion 30 of the apparatus, a discussion will be had of the primary mechanism of the apparatus as seen in the Figures. As seen, the general apparatus 12 would comprise a basic framework having a lower frame members 36 running parallel on either side of the vehicle with upper frame members 38 extending upwardly therefrom to an upper cross member 40 in parallel relationship to lower member 36 and a downward depending member 42. The front members 38 and 42 interconnecting the upper and lower members 36 and 40 respectively to form the basic side walls of the frame of the apparatus. The frame of the apparatus would be interconnected via the top surface portion 44 via welding or the like, to form the basic framework of the apparatus. Of couse, as seen in the drawing, the power system and driver would be mounted upon floor portion 44 during operation of the vehicle.

There is further included in the frame work an upper connecting pipie member 48, which would be positioned between members 40 to serve as the rear mounting means for the steering mechanism of the apparatus. Member 48 would be equipped with a centrally located collar member 51 which would be rotatably mounted along member 48, having an upward depending mounting post 53. The collar 51 and mounting post 53 is used primarily to attach the steering mechanism of the apparatus thereto. That mechanism would include an upper triangular frame portion 52 which comprises a base member 53 making up the base of the triangular frame and members 55 and 57 extending from the end portions of the base to a centrally located apex 59 which is connected to a housing 61 having an internal bore 63 which can be accommodated onto mounting post 53. Therefore, framework 52 is movable from side to side via mounting post 53 as seen by arrows 61 and 63 respectively. There is provided a pair of downwardly depending rear wheel mounting posts 65 and 67 wherein the rear wheels 16 are mounted via an axle member 69, so that movement of the frame 52 from side to side would steer the vehicle accordingly. In order to achieve this movement, there is provided a first hydraulic cylinder member 70 interconnected between the frame 48 and a post 57, so that extension and retraction of the cylinder would move the member 52 from side to side. Likewise, there may be further included an additional hydraulic cylinder 72 mounted between the upwardly extending post 42 and the driving portion in order to achieve upward and downward movement of the driving portion of the apparatus during use of the apparatus.

Turning now to the overall harvesting portion of the apparatus; as a reminder, it should be noted that in their primary setting, crawfish are sensitive to movement and light, and therefore tend to reside in the darker and the bottom most portion of ponds. Therefore, in order to properly harvest crawfish through a vehicle of such, it is necessary that the crawfish, in some manner, become aroused and moved from their hiding areas along the bottom of the pond upward into the water. In the primary embodiment as seen in the Fifures, this is achieved through the following manner.

During harvesting of crawfish from their natural habitat of flooded land, the vehicle moves forward and the crawfish encounters a primary arousing means. This means comprises a collection roller 111 which extends across the front width of the apparatus, mounted on a pair of arms 112 and 114. This is seen more clearly in top view in FIG. 3. Roller 111 for the most part would achieve the end of disturbing the crawfish that may be attached to grass growing in the water. As seen in FIG. 1B, roller 111 is traveling through water, and encounters grass stalks 15, that may have a crawfish 16 clinging thereto. When roller 111 contacts grass 15, the crawfish 16 release its grasp and is swept over roller 111 by a current surge over roller 111. The crawfish is gently moved onto a receiving collection surface wherein the crawfish are moved rearward and upward into a primary conveyor system. It should be noted, as seen in the drawings, that the mounting arms 112 and 114 are pivotally mounted along a pivot point 118, with the arms being rendered buoyant to move up and down via a spring loaded piston member 120 mounted between the arms 112 and 114 and an upper point 122 on frame member 30. This would acheive the ability of roller 111 to move upward and downwardly as it follows the contour of the bottom of the pond.

As was discussed, directly to the rear of roller 111 there would be included a retaining skirt member 130, the skirt member 130 spanning the entire width of roller 111 with the front edge 132 being directly above the top portion of roller 110 and the skirt extending approximately 1 foot to 1½ feet rearwardly of the roller to the rear edge 134. This receiving surface 130 as seen in the Figures, would serve as an initial dropping point, for the crawfish as the crawfish would be washed rearwardly by the movement of the vehicle in the direction of arrows 136. Directly behind the surface of member 130 at screen 134 the crawfish would then be moved to a primary containment zone 140 which would comprise a substantially solid floor portion 142 and angulated side walls 144 and 146 being porous in nature for allowing flow of water and the escape of immature crawfish therethrough as indicated by Arrows 148 and containing any mature crawfish that are contained within the containment area 140. Again, due to the movement of the vehicle and the natural affinity for the crawfish to move with the flow of water, the crawfish would move to the rear of the containment area to encounter the next phase in the collection.

Returning to the use of receiving surface 130, one of the problems initially encountered with the harvesting is that these crawfish having been urged over roller 111, if the vehicle did stop, the crawfish would tend to move back across roller 111 and escape harvesting. Under the present system, as the crawfish moved up receiving surface 130 and over the rear edge 134, into the containment area 140, if per chance they should be washed backed toward the roller, receiving surface 130, which extends above floor portion 142, of containment area 140, would block any further movement of the crawfish to the front of the vehicle and therefore as the vehicle returned to harvesting the crawfish would be moved toward the rear of the containment area 140 by the pond water flowing therethrough.

Following the movement of the crawfish out of the rear portion 143 of the containment area 140, the crawfish would then be swept onto the conveyor system 150 which would comprise a conveyor belt as seen in the Figures, again being porous in nature so that any water or immature crawfish conveyed onto the belt would flow therethrough, but the mature crawfish would be conveyed on the belt. The conveyor belt would be angulated upward to an angle between the floor of the containment area to the upward rear collection zone 154 of the apparatus so that when the crawfish reached the top of the belt they would be thrown out into a rear collection zone 154 for storage and subsequent processing, while the grass and debris would fall through the space between the end of conveyor belt 150 and rear collection zone 154 back onto the pond below. In addition, it should be noted that conveyor belt 150 is likewise provided with side walls 152 to prevent the possible movement of crawfish back into the pond or out of the system, and the conveyor belt would be operated via a hydraulic motor or the like for movement of the trapped crawfish into the collection box 154. Also incorporated into the apparatus is a means for returning the grass that has been laying flattened by roller 111 to its standing upright state. This is accomplished by a rear roller 175 which likewise is mounted to the frame 36, and extends substantially the width of the apparatus, incorporating a plurality of flexible teeth members 177 to comb the lain grass and to stand it upright as the apparatus passes thereby.

Further, as is illustrated in FIG. 3, the apparatus would include a means for assisting in the buoyancy of the apparatus as it moved through the water in order to harvest crawfish. This buoyancy means would include a layer of foam material 160 situated beneath the containment zone plate 142, and a lower most bottom plate 162. This layer of buoyant foam between the two plates would provide for additional buoyancy to the apparatus as it moved through the water.

The second principal embodiment would, as seen in FIG. 2, include a means for arousing the crawfish from their hiding areas along the bottom of the pond upward into the water in advance of the primary roller. This is achieved through an eductor system. This system would incorporate a pump member 100 mounted on the floor portion 12 of the apparatus, as driven by an engine or motor 102 wherein water from the pond is educted into pump 100 and forced through lines 104 to be exited under pressure through exit nozzles 106 as seen in the drawing. Exit nozzles 106 are contained within an outer most housing 108 which includes an air entry port 110 so that as the water is coursed through the line 104 air is educted into port 110 travels down an annular space 112 between the nozzle 106 and the outer housing 108 so that upon entry into the water there is an eduction of air and water mixed so that the water becomes frothing. This educting of air into the water achieves the end of having the crawfish rendered to a point "helpless" and a tendency to float up into the water as opposed to hiding on the bottom of the pond. As seen in the Fifures, the exit nozzles 106 of the eductor system for extending a point somewhat in advance of the vehicle itself, for the very purpose of having the crawfish turbulent at the point that the primary vehicle reaches the crawfish for trapping. The eductor lines 108 would be controlled in their operation via hydraulic cylinder 120 and 122 respectively.

Following the eduction of the air into the water as explained, the vehicle moves forward and the crawfish would then encounter the primary collection roller 111 extending across the front width of the apparatus as in the preferred embodiment, and the operation of this embodiment would be undertaken in the manner as previously explained.

In FIG. 6 there is illustrated an embodiment of the harvester portion of the apparatus which can be classified as an abbreviated embodiment in that there is illustrated the primary roller member 111 mounted on arm members 112 and 114, with receiving means defined by skirt member 130 to the rear of roller 111 for receiving the crawfish. However, it should be noted that this particular embodiment would not include the primary containment area 140, with skirt member 130 resting on the conveyor means 150 for conveying the crawfish directly into the collection zone 154. Therefore, in this particular embodiment, there would be no primary containment area, and therefore the apparatus would be substantially more compact and may be utilized for smaller areas of collection which would not need the containment zone 140.

Other embodiments of the apparatus would include means for moving the crawfish from the primary containment zone 140, following their having been moved over the roller 111 into that zone. As seen in FIGS. 5 and 6 that means may include a power driven blade member such as the type that may be found on an outboard motor or the like 153, wherein following the conveying of the crawfish into the containment area 140, the blade member would be rotated to serve as a means for flowing water through a primary channel zone and along with the water flow would course the crawfish into pipe 156. In addition with the crawfish and water being swept upwardly through pipe member 156 into the collection box 154, with the water flowing through the floor of the box and the crawfish being collected therein.

Figure 7B:
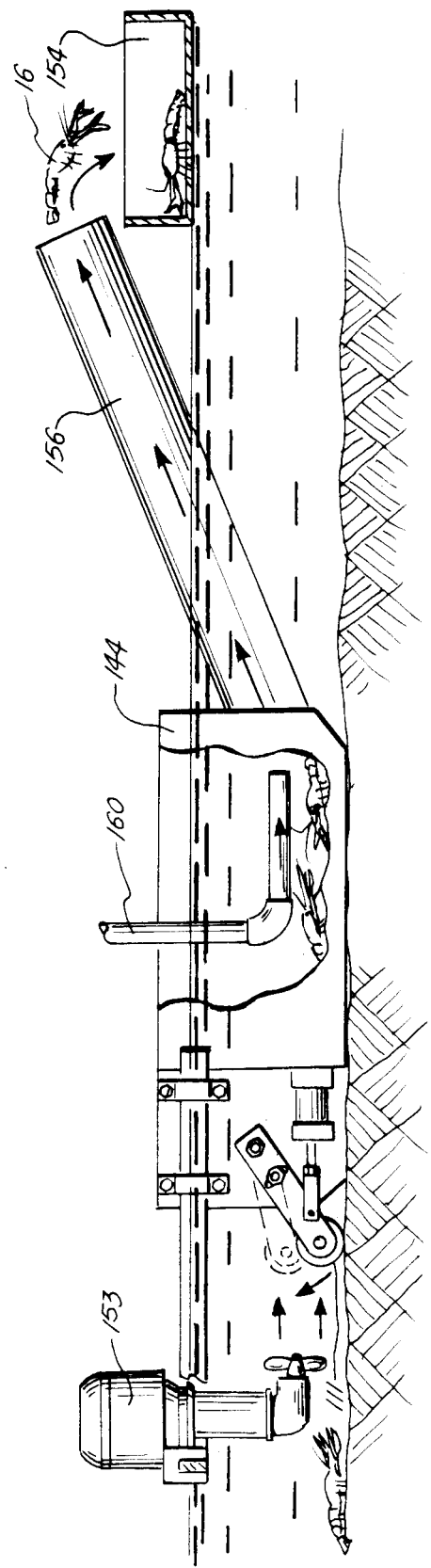

There could be several other methods of moving the crawfish to the collection box. One may be the possibility of simply coursing a stream of water through a separate flow pipe 160 as seen in FIGS. 7A and 7B, with the crawfish being "sucked" through the flow of water upward through the collection pipe 156 along pipe member 156 and into the storage box 154. In essence, pipe member 156 would replace conveyor 150.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A vehicle for harvesting crawfish in their natural habitat, comprising:
   a. a first primary frame portion;
   b. means for advancing the frame portion forward through the water during harvesting;
   c. a rigid primary roller extending a distance of at least the width of the vehicle, for dislodging crawfish from their habitat in the water as the vehicle advances through the water;
   d. means for directing the travel of and receiving the dislodged crawfish onto a first portion of the vehicle; and
   e. means for conveying the crawfish received to a primary collection zone.

2. The apparatus in claim 1, wherein the receiving means comprises a plate member disposed rearwardly and extending substantially the length of the dislodging means for receiving crawfish that are urged over the dislodging means by the water surge.

3. The apparatus in claim 1, further including a primary containment area which comprises a lower portion of the vehicle, defined by a plurality of orificed side walls and a solid floor portion, so that water may flow through the side walls yet contain crawfish upon the floor portion of the containment area.

4. The apparatus in claim 1, further comprising arousing means, which includes an eductor system at a point in advance of the vehicle wherein air and water is educted into the pond for moving the crawfish from the bottom of the pond to a point in the vicinity of the dislodging means.

5. The apparatus in claim 1, wherein the conveying means is situated at a point rearwardly of the containment area, for conveying the crawfish rearwardly and upwardly out of the water during the harvesting process.

6. The apparatus in claim 1, wherein the primary collection zone further comprises a collection means for receiving the crawfish from the conveying menas.

7. An apparatus of the harvesting of crawfish in its natural habitat of a land area, containing surface water, comprising:
   a. a movable vehicle, including a primary harvesting portion;
   b. means for propelling and steering the vehicle through the harvesting land area;
   c. means on the vehicle for providing air and fluid turbulence in the direction of the movement of the vehicle;
   d. a rigid roller member, extending substantially the width of the vehicle, and beneath the surface of the water, for tracking along the bottom of the land area, and dislodging any crawfish located within the grass on the water bottom, and creating a current surge to urge the crawfish into the primary harvesting portion;
   e. conveyor means, associated with the first receiving member, for conveying the crawfish to a collection zone above the level of the surface water.

8. The apparatus in claim 7 wherein the vehicle is a four wheel vehicle and hydraulically driven.

9. The apparatus in claim 7, wherein the primary harvesting portion further includes perforated side walls for allowing water to flow therethrough while crawfish are being contained therein.

10. The apparatus in claim 7, wherein the means for providing air and liquid turbulence in the surface water, further comprises:
    a. a pump means for pumping water therethrough;
    b. fluid flow lines connected to the pump means for flowing water under pressure;
    c. means, including a passage for receiving air into the fluid flow line, to provide aerated water flow; and
    d. nozzle means at the end of each fluid flow line for ejecting the aerated water flow into the surface water.

11. The apparatus in claim 10, wherein the roller further includes a skirt extending substantially along the length of the roller for preventing retreat of crawfish out of the primary harvesting portion, following the entry of the crawfish therein.

12. The apparatus in claim 8, wherein the storage area above the level of the surface water would be contained on the vehicle for allowing storage of the crawfish thereupon.

13. A method of harvesting crawfish in a land area containing surface water, comprising the following steps:
    a. providing a movable vehicle through the surface water of the land area;
    b. providing a substantially rigid roller on the forward portion of the vehicle and extending substantially the width of the vehicle for contacting grass contained within the water containing crawfish;
    c. moving the vehicle through the flooded land area so that any crawfish habituating within the grass are dislodged from the grass as the grass is forced beneath the roller, and the crawfish are urged rearwardly of the roller;

d. receiving the crawfish urged by the roller within a primary containment portion; and e. conveying the crawfish from the primary containment portion to an area defining a collection zone for the crawfish.

14. The method in claim 13, further comprising the step of turbulating the water directly ahead of the vehicle as the vehicle is moved through the water filled land area so that any crawfish contained on the bottom of the water are moved to a position to be urged into the primary harvesting portion.

15. The method in claim 13, further comprising the step of storing the crawfish that have been conveyed above the surface of the water for further process.

16. The method in claim 13, wherein between the step of receiving the crawfish and conveying the crawfish, the crawfish are moved through a containment area so that smaller immature crawfish may be returned to the natural habitat and the mature crawfish are contained within the area for conveying to the collection zone.

* * * * *